UNITED STATES PATENT OFFICE.

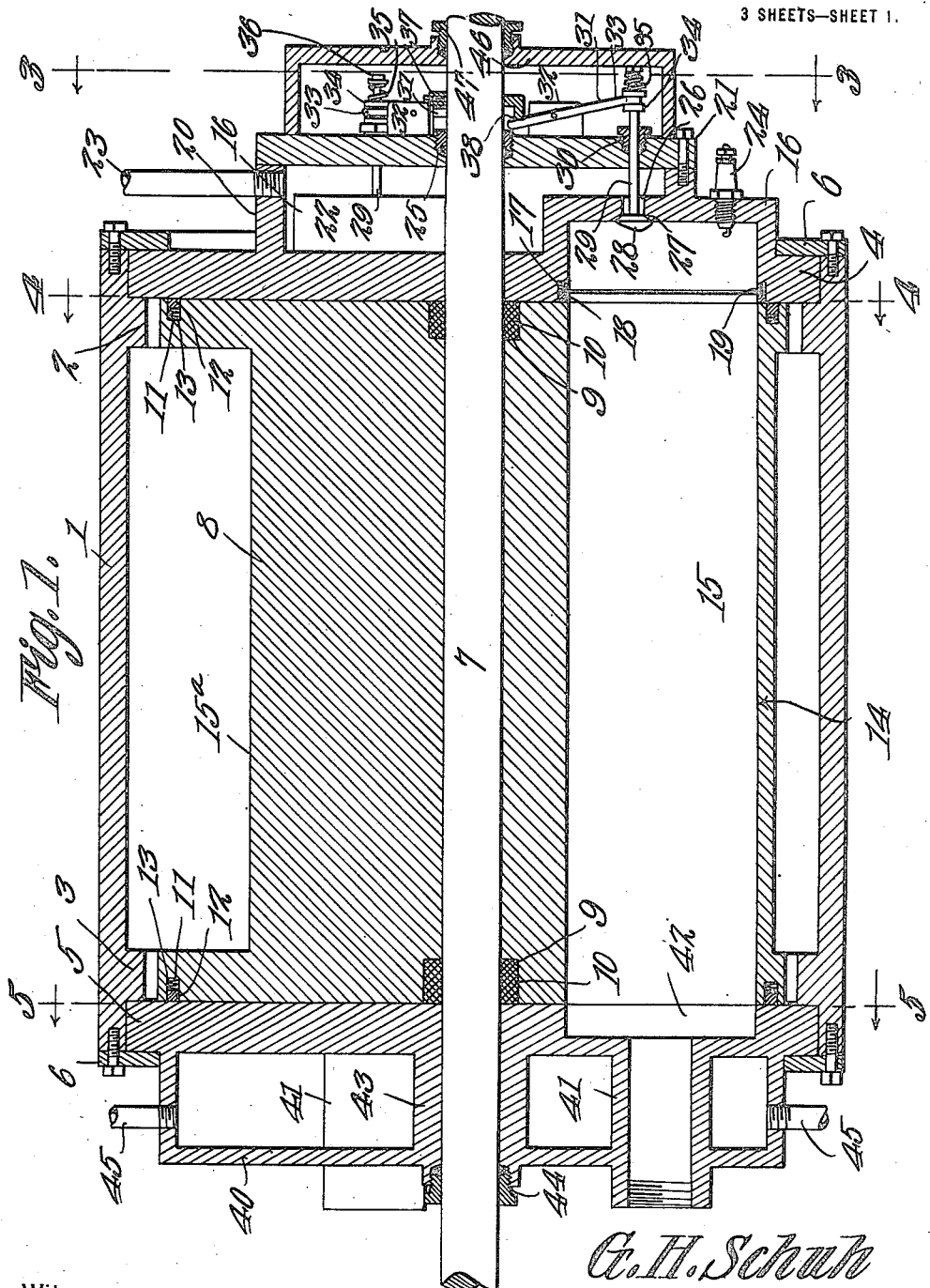

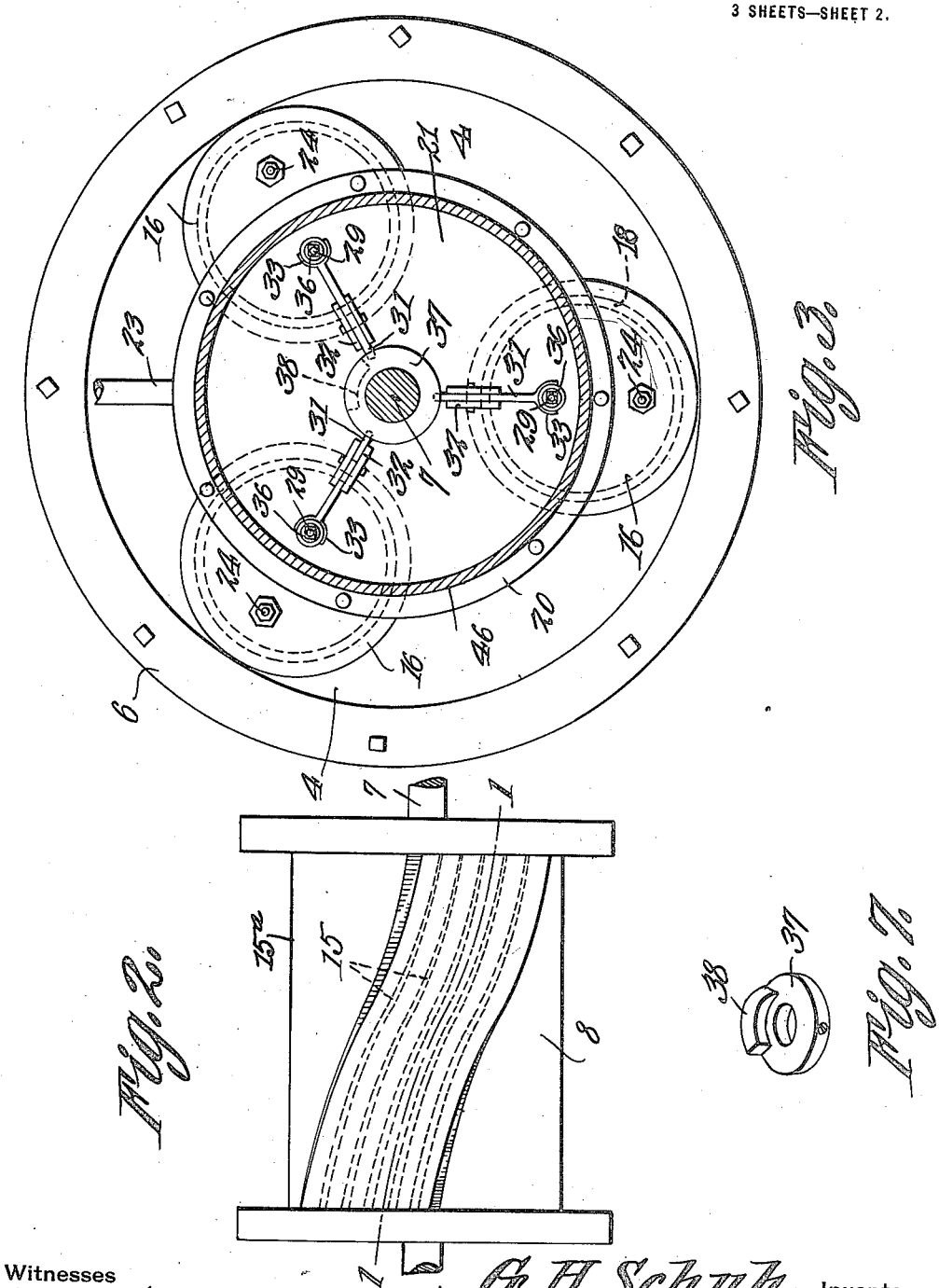

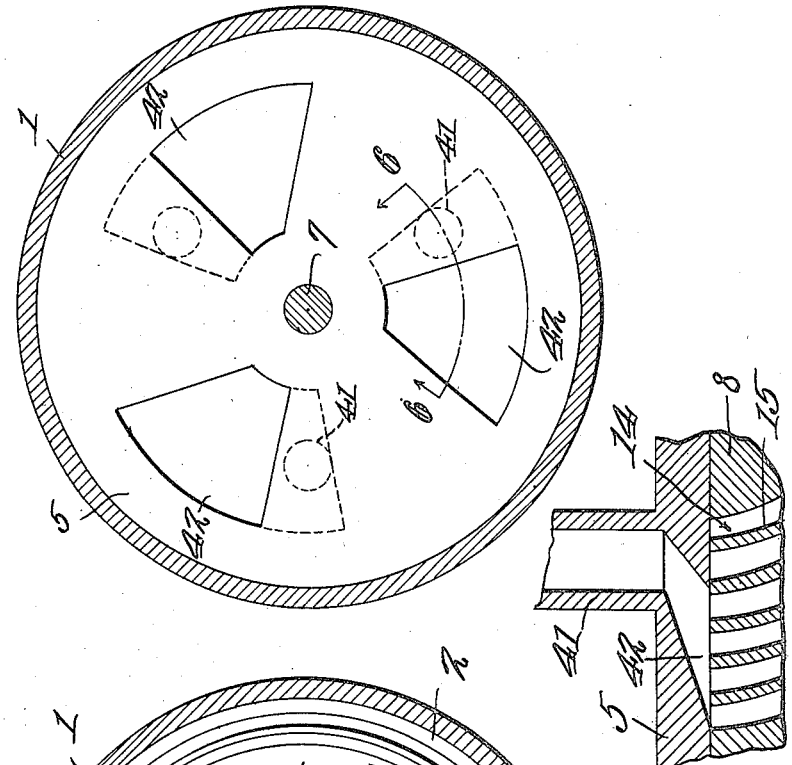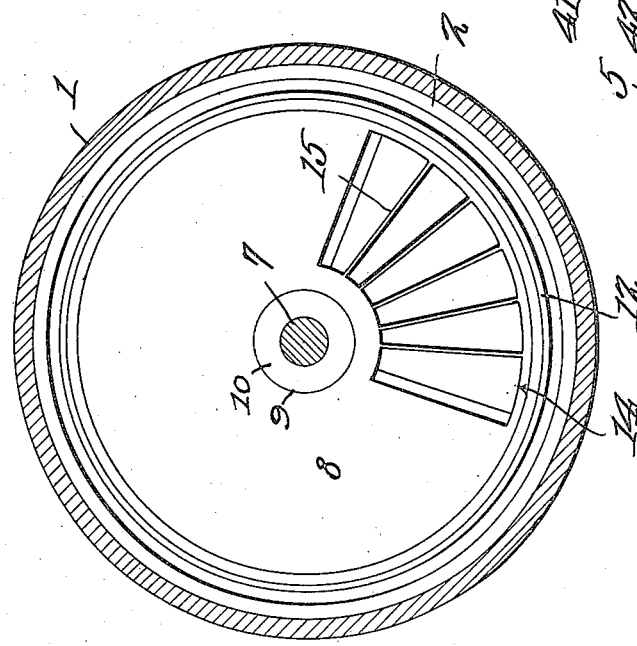

GEORGE H. SCHUH, OF EARL PARK, INDIANA.

ROTARY INTERNAL-COMBUSTION ENGINE.

1,163,956.  Specification of Letters Patent.  Patented Dec. 14, 1915.

Application filed March 18, 1915. Serial No. 15,359.

*To all whom it may concern:*

Be it known that I, GEORGE H. SCHUH, a citizen of the United States, residing at Earl Park, in the county of Benton and State of Indiana, have invented a new and useful Rotary Internal-Combustion Engine, of which the following is a specification.

The present invention appertains to internal combustion engines, and aims to provide a novel and improved explosive engine of the rotary or turbine type.

The invention contemplates the provision of a rotary or turbine internal combustion engine of such construction and operation as to require a minimum amount of fuel, and which will be highly efficient in operation.

As a more specific object, the invention aims to provide an internal combustion engine embodying a turbine rotor adapted to be forcibly driven by the explosion of the gaseous fuel, whereby maximum power is derived from the burning of the fuel, and whereby the engine will operate smoothly, and without the vibrations and shocks incident to the ordinary internal combustion engines embodying reciprocatory pistons.

A further object of the invention is the provision of an internal combustion engine of the character above indicated, having improved features to enhance the utility and efficiency thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein :—

Figure 1 is a longitudinal section of the improved engine, the intake and exhaust ends being slightly distorted out of position, for purpose of clearness, the section being taken on a curved line as indicated by the line 1—1 of Fig. 2. Fig. 2 is a reduced side elevation of the turbine rotor. Fig. 3 is a cross sectional view taken on the line 3—3 of Fig. 1. Figs. 4 and 5 are reduced cross sectional views taken on the lines 4—4 and 5—5 respectively, of Fig. 1. Fig. 6 is a sectional detail taken on the line 6—6 of Fig. 5. Fig. 7 is a perspective view of the cam for operating the intake valves.

In carrying out the invention, there is provided a cylindrical open ended casing 1, which may be supported upon a suitable base or frame, and which is provided adjacent its ends with internal annular ribs 2 and 3. The ribs 2 and 3 are arranged adjacent the intake and exhaust ends of the engine, respectively, and circular intake and exhaust heads or plates 4 and 5, respectively, are secured within the respective ends of the casing 1. The heads 4 and 5 rest against the respective ribs 2 and 3 and fit snugly within the ends of the casing, and rings or annuli 6 are secured to the ends of the casing 1 and overlap the heads 4 and 5 for clamping the heads securely in place.

A central or axial shaft 7 is journaled through the heads 4 and 5, and a rotor 8 is keyed upon the shaft 7 within the casing 1 and has its ends working close adjacent the heads 4 and 5 of the casing. The ends of the rotor 8 are provided with stuffing boxes 9 surrounding the shaft 7 and in which suitable packing 10 is disposed to engage the shaft 7 and heads 4 and 5 for confining the oil or other lubricant between the bearings of the heads 4 and 5 and the journals of the shaft. The ends of the rotor 8 are also provided adjacent the periphery or circumference of the rotor with annular grooves 11 in which annular packing rings 12 are movable to bear against the heads of the casing, suitable springs 13 being disposed between the packing rings 12 and the bottoms of the grooves 11 for forcing the said packing rings snugly against the heads of the casing. The packing rings 12 prevent the escape of gas from between the ends of the rotor and heads of the casing to the annular space between the periphery of the rotor and casing 1.

The rotor 8 is provided between its shaft 7 and one side of the rotor, with a spiral or helical passage 14 extending from one end to the other, and the rotor is provided with a plurality of spiral or helical blades or vanes 15 extending from end to end within the passage 14 and dividing the said passage. The blades 15 are preferably arranged radially of the rotor, and those ends of the blades at the intake end of the engine are sharpened to avoid or reduce the end thrust of the rotor, when the explosions occur, as will hereinafter more fully appear. The rotor 8 is preferably cut away, as at 15ª, diametrically opposite the passage 14, whereby the rotor will be balanced properly to rotate freely.

The intake head 4 of the casing is provided between its center and margin with outstanding explosion chambers or pockets 16, there being in the present engine as illustrated, three equi-distant explosion chambers or pockets, although the number may be increased or reduced according to the size and capacity of the engine. The explosion chambers or pockets are normally closed by the respective end of the rotor 8, that is, when the passage 14 is out of registration with the explosion chambers, and the passage 14 of the rotor is out of registration with each explosion chamber for approximately two-thirds of a revolution of the rotor, and during which interval the gaseous mixture within the explosion chamber may be put under compression. In order to prevent the leakage of the gaseous mixture or fuel from the explosion chambers, the inner side of the head 4 is provided with an annular rabbet or groove 17 around each explosion chamber, and a packing ring 18 is movable within each rabbet or groove 17 and bears against the respective end of the rotor under the influence of springs 19 disposed within the rabbet or groove 17 behind the ring 18.

The intake head 4 is provided with a gas or fuel chamber, and to this end, the head 4 is provided with an outstanding annular flange 20 which is also integral with the combustion chambers or pockets 16. The chambers or pockets 16 project partially into and partially out of the flange 20, and a cover or plate 21 is secured to the edge of the flange 20 to define the gas or fuel chamber 22 between the cover 21 and head 4 and within the flange 20. The gas or fuel intake pipe 23 is engaged through the flange 20 to communicate with the chamber 22, and extends to the carbureter (not shown), and a compressor (not shown) is preferably interposed in the pipe 23 for forcing the gaseous mixture into the chamber 22 under compression.

A spark plug or other igniter 24 is engaged through each chamber or pocket 16 outside of the flange 20, or through that portion of the chamber 16 which projects outwardly from the flange 20, and suitable electrical connections and timing means may be employed in connection with the spark plugs for igniting the charges at the proper times. Since the electrical ignition system is no part of the present invention, it is not necessary to illustrate or describe the same in detail.

The shaft 7 is journaled through the cover or plate 21, and suitable packing means 25 is carried by the cover 21 and embraces the shaft 7 for preventing leakage through the cover 21 adjacent the shaft, as will be apparent.

The chamber 22 is in communication with the explosion chambers 16, and to this end, the portions or partitions of the chambers 16 within the flange 20 are provided with ports or apertures 26. The chambers 16 are provided with walls parallel with the cover 21, and these walls are provided with the ports or apertures 26 establishing communication between the supply chamber 26 for the gaseous mixture of fuel and the explosion chambers. The chambers 16 are provided with beveled valve seats 27 at the inner ends of the apertures or ports 26, with which puppet valves 28 coöperate. The valves 28 are provided with outwardly projecting valve stems 29 projecting through the ports 26 and passing slidably through the cover or plate 21 of the chamber 22. Suitable packing means 30 are carried by the cover 21 for coöperation with the valve stems 29 to prevent leakage.

The valve gear embodies a plurality of levers or rockers 31, one for each explosion chamber, and which are fulcrumed to outstanding portions 32 carried by the cover 21. The levers 31 are located at the outer side of the cover 21, and the remote arms of the levers 31 are provided with forks 33 straddling or engaging grooved collars 34 slidable upon the valve stems 29. Coiled wire compression springs 35 are disposed upon the free portions of the valve stems between the collars 34 and nuts or other stops 36 engaged upon the free ends of the valve stems. The levers 31 are operated by means of a cam ring 37 secured upon the shaft 7 at the outer side of the cover 21 and having an inwardly projecting cam 38 at one side and of suitable formation for properly operating the levers one at a time. The cam 38 coöperates with the adjacent or inner arms of the levers 31, and when the cam ring 37 is rotated with the shaft 7, the cam 38 will swing the levers 31 in succession. The cam is properly arranged for swinging the levers 31 just prior to the explosions. Thus, when the cam 38 engages one of the levers 31, it will swing the corresponding arm thereof inwardly or toward the center of the engine, and the other or remote arm of the lever will be swung outwardly and this will move the collar 34 of the respective valve outwardly against the spring 35 and this will cause the corresponding valve 28 to be yieldably seated for closing the respective port 26. It is to be understood that the valves 28 are normally open to allow the charges of gaseous mixture to flow from the chamber 22 through the ports 26 into the explosion chambers, and the valves 28 are forcibly seated during the occurrence of the explosions to prevent the gaseous fuel from passing backwardly from the explosion chambers into the gas supply chamber 22.

Coming to the exhaust end of the engine, the exhaust head 5 is provided with an outstanding circular water jacket 40, and with outwardly projecting outlet sleeves 41 extending through the water jacket 40, and adapted for connection with an exhaust manifold or conduit. The exhaust sleeves or ports 41 are three in number to correspond with the three explosion chambers, and are arranged at the proper angle relative to the respective or complementing explosion chambers according to the offsetting of the ends of the passage 14, as suggested in Fig. 2. The inner side of the head 5 is provided with diagonal mouths 42 for the exhaust sleeves or ports 41, and which are arranged at the proper angle so that the products of combustion may flow properly from the passage 14 of the rotor through the outlet sleeves or ports 41.

The head 5 and its water jacket 40 are provided with a hub or bearing 43 through which the shaft 7 is journaled, and suitable packing means 44 is carried by the bearing 43 to prevent the leakage of lubricant from the bearing 43. The water jacket 40 is provided with suitable water inlet and outlet pipes 45 which may be connected to a radiator (not shown) or other water cooling medium, so that cool water is supplied into the jacket 40 for cooling the engine.

In operation, the gaseous mixture is supplied into the chamber 22, under compression from the carbureter and compressor through the pipe 23, and from the chamber 22 the mixture will flow through the ports 26 into the combustion chambers. Since the explosions occur in succession in the series of explosion chambers, while an explosion is occurring in one explosion chamber, the other two explosion chambers are receiving fresh charges from the chamber 22 and these charges are being placed under compression. The parts are so arranged, that when the passage 14 is being brought into registration with one of the explosion chambers, the valve operating cam 38 will swing the respective valve lever 31 for seating the respective valve 28, and in which event, the charge in the explosion chamber under discussion is ignited in any suitable manner. The gaseous mixture or charge being ignited will expand quickly and the products of combustion will be forced into the passage 14 of the rotor between the spiral blades 15, and the impact of the expanding gases or products of combustion against the blades 15 will impart a rotatory movement to the rotor. The products of combustion thus being forced into and through the passage 14 of the rotor will serve to actuate the rotor in the proper direction, and the outlet or discharge end of the passage 14 is brought into registration with the respective outlet passage or port of the exhaust head 5 to allow the products of combustion to pass outwardly after the energy is spent. Then, when the passage 14 of the rotor reaches the next succeeding explosion chamber, a new explosion occurs in the said chamber, and the explosion chamber in which the previous explosion occurred, is supplied with a new charge, since the cam 38 having passed the corresponding valve actuating means, will allow the corresponding valve 28 to open. Thus, there are three explosions for each rotation of the rotor, according to the number of explosion chambers employed, and the rotor is thus forcibly actuated.

The explosions occur in succession, and during the occurrence of an explosion in one explosion chamber or pocket, the other chambers or pockets are being supplied with the new charges, and it will also be noted that after the occurrence of the explosions, the passage 14 is brought into timely communication with the exhaust passages or ports to allow the products of combustion to escape properly. The present engine is therefore of the rotary or turbine type, and will operate smoothly, and without the vibrations and jars usually incident to an internal combustion engine of the reciprocatory piston type.

The valve gear is preferably inclosed in oil or other lubricant, and to this end a lubricant case 46 is secured to the cover 21 of the chamber 22 so as to inclose the valve gear, and is filled with oil or other lubricant with which the parts of the valve gear are brought into contact for lubricating the parts. The shaft 7 extends through the case 46 and the case is provided with suitable packing means embracing the shaft to prevent the leakage of the lubricant from the lubricant chamber.

The present engine may be employed upon automobiles, or may be used for divers other purposes, and has numerous advantages and attributes as will be apparent from the foregoing, taken in connection with the drawings.

It is preferable to partially fill the casing 1 with oil or other lubricant, whereby the rotor in revolving will cause the lubricant to be applied between the bearing portions of the rotor and casing. The packing rings 18 will prevent the lubricant from flowing into the explosion chambers. It is also to be noted that the rotor 8 normally closes the exhaust passages whereby the products of combustion in being discharged through one exhaust passage into the manifold (not shown) will not be liable to force the products of combustion within the intake manifold through the other exhaust passages back into the casing, which would be objectionable. It might also be stated in conclusion, that the electrical ignition system is so operated that the charge within each explosion chamber is ignited just prior or during the time that the passage 14 of the rotor is being brought into registration with the respective explosion chamber, whereby as soon as the passage 14 is brought into registration with the respective explosion chamber, the gases in expanding will create a powerful pressure against the blades 15 of the rotor to actuate the rotor efficiently. The respective valve is naturally seated just prior to the ignition of the charge.

Having thus described the invention, what is claimed as new is:

1. In a rotary internal combustion engine, a casing having a head provided with a series of outstanding explosion chambers and a supply chamber partially inclosing the explosion chambers, the explosion chambers having ports in communication with the supply chamber and having valve seats at the inner ends of said ports, valves coöperable with said seats and having stems projecting through the ports and the supply chamber, a shaft journaled through said head, a rotor carried by the shaft within the casing and having a spiral passage extending therethrough adapted to be brought into registration in succession with said explosion chambers, the rotor normally closing the explosion chambers, the said valves being normally unseated when the said passage is out of registration with the explosion chambers, and a valve gear operably connecting said shaft and valve stems for seating the valves during the time that said passage is in registration with the explosion chambers.

2. In a rotary internal combustion engine, a casing having a head provided with a series of outstanding explosion chambers and a supply chamber partially inclosing the explosion chambers, the explosion chambers having ports in communication with the supply chamber and having valve seats at the inner ends of said ports, valves coöperable with said seats and having stems projecting through the ports and supply chamber, a shaft journaled through said head, a rotor carried by the shaft within the casing and having a spiral passage extending therethrough adapted to be brought into registration in succession with said explosion chambers, the rotor normally closing the explosion chambers, the said valves being normally unseated when the said passage is out of registration with the explosion chambers, levers operatively connected to the valve stems, and a cam carried by the shaft and coöperable with the levers for seating the valves during the time that said rotor passage is in registration with the explosion chambers.

In testimony that I claim the foregoing as my own, I have hereto affixed my signature in the presence of two witnesses.

GEORGE H. SCHUH.

Witnesses:
GEORGE BENNER,
JOSEPH J. HARTMAN.